Figure 1:
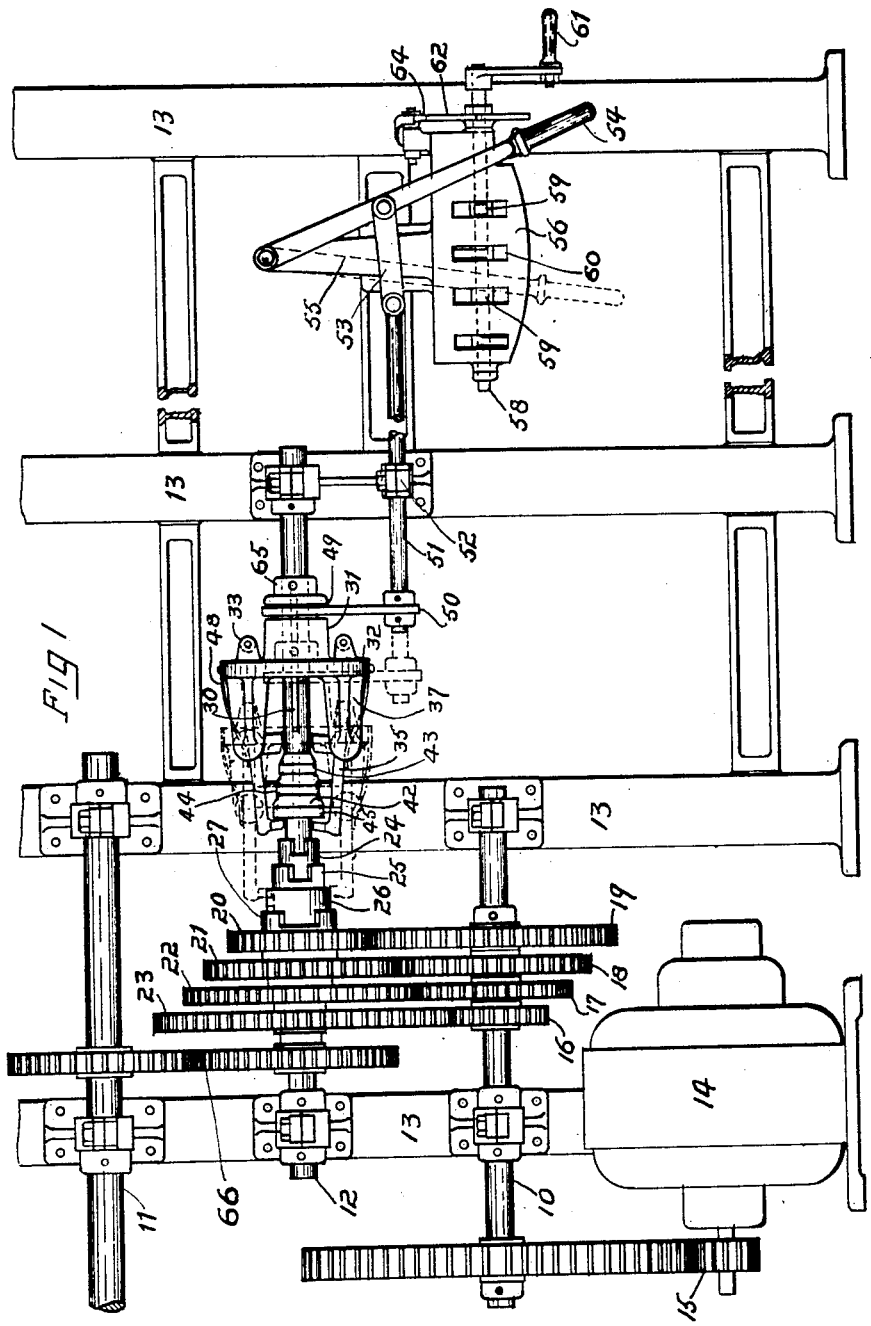

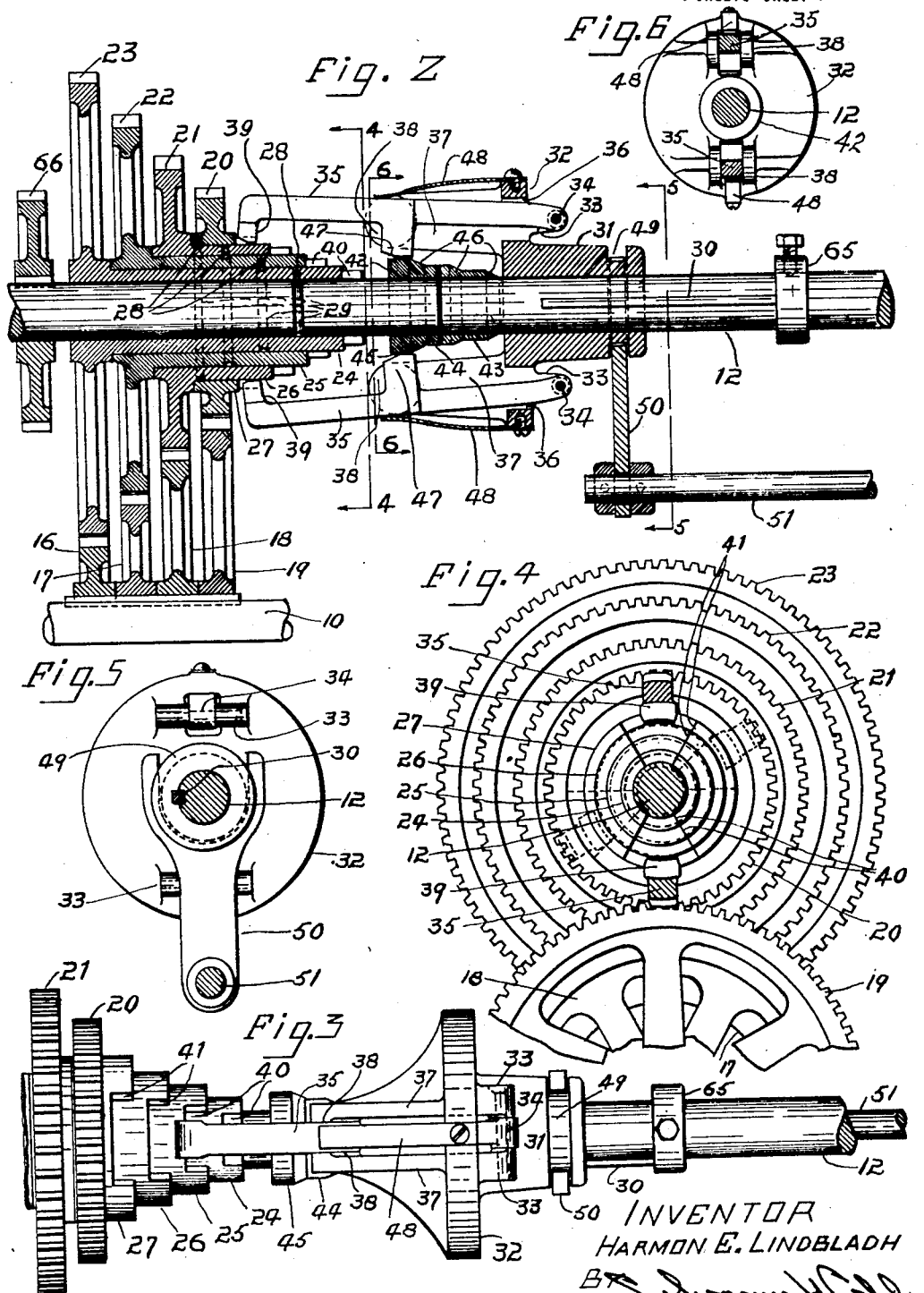

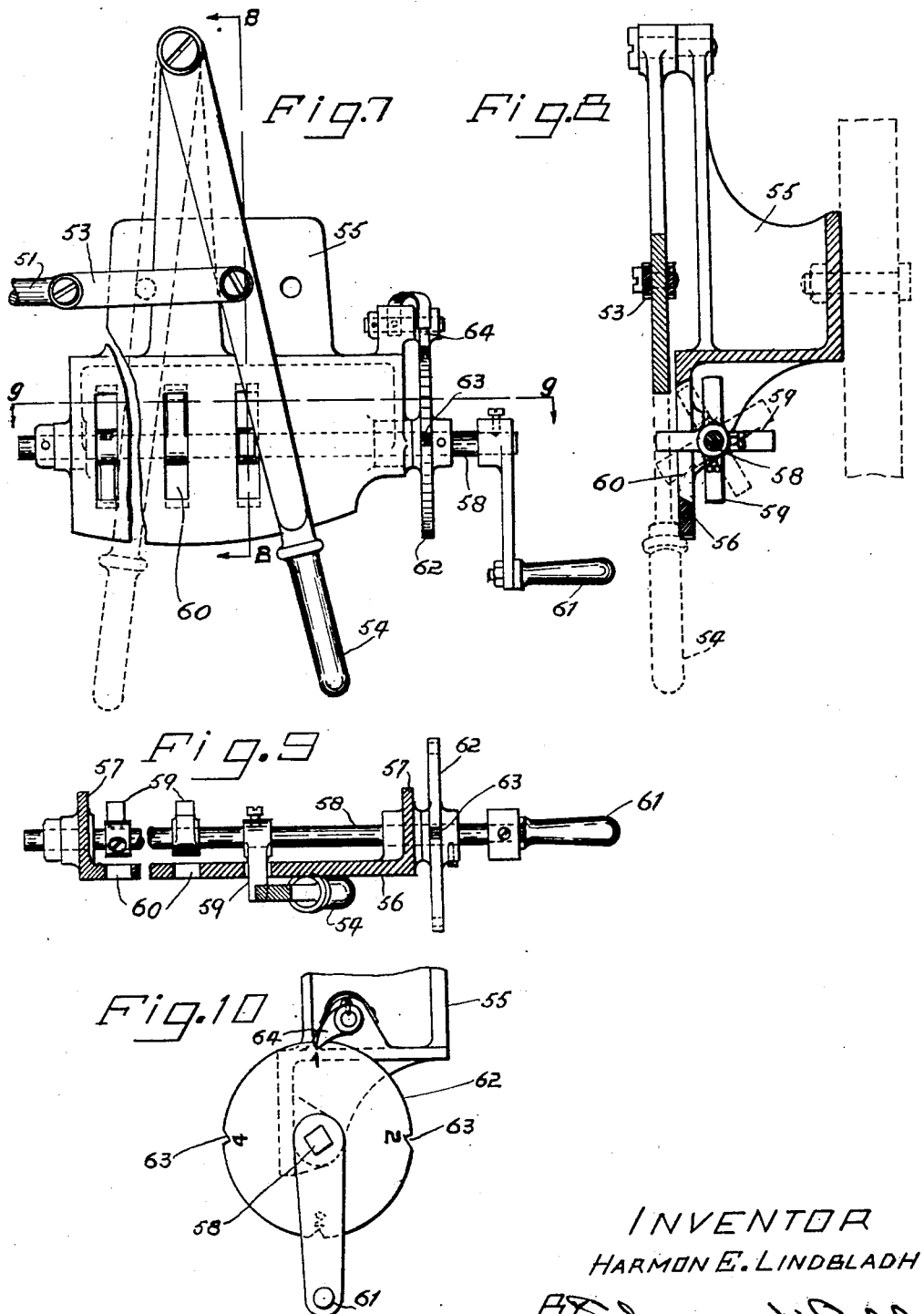

UNITED STATES PATENT OFFICE.

HARMON E. LINDBLADH, OF BOSTON, MASSACHUSETTS.

CHANGE-SPEED MECHANISM.

1,387,786.  Specification of Letters Patent.  Patented Aug. 16, 1921.

Application filed April 14, 1919. Serial No. 289,776.

*To all whom it may concern:*

Be it known that I, HARMON E. LINDBLADH, a citizen of the United States, residing at Boston, in the county of Suffolk and State of Massachusetts, have invented a new and useful Change-Speed Mechanism, of which the following is a specification.

In various types of apparatus, as ruling machines, it is desired to transmit the rotative effect of a driving mechanism to a driven mechanism at varying speeds. The present invention furnishes a simple and positive connecting mechanism for accomplishing this purpose, and one in which the changes are readily and accurately brought about.

The accompanying drawings illustrate a particular embodiment of my improved change-speed mechanism, Figure 1 being a side elevation thereof;

Fig. 2, an enlarged sectional elevation;

Fig. 3 a partial top plan view of the portion shown in Fig. 2;

Figs. 4, 5 and 6, transverse sections on the lines 4—4, 5—5 and 6—6, respectively, of Fig. 2;

Fig. 7, a side elevation of the controlling device;

Fig. 8, a vertical section on the line 8—8 of Fig. 7;

Fig. 9, a horizontal section on the line 9—9 of Fig. 7; and

Fig. 10, a detail, in end elevation, of the indicating device.

I have shown a driving shaft 10, a driven shaft 11, and an intermediate controlling shaft 12 journaled in a suitable frame 13. The shaft 10 receives power from a convenient source 14 through gearing 15. Fast upon the shaft 10 is a series of adjacent gears 16, 17, 18 and 19 of gradually increasing diameter, meshing in pairs with corresponding gears 20, 21, 22 and 23 of gradually decreasing diameter. The gears of the last-mentioned series are respectively fixed upon four concentric sleeves or hubs 24, 25, 26 and 27. The inner sleeve 24 has a projection in the form of a screw 28 extending into an annular groove 29 in the shaft 12, and having its head flush with the surface of the sleeve 24. Each succeeding sleeve 24, 25 and 26 is provided with a similar groove 29 engaged by a screw 28 in the surrounding sleeve. The effect of this connection is that any one of the sleeves and gears may be rotated independently of the others, while being held against longitudinal movement over their shaft.

Splined at 30 against rotation while permitted to travel upon the shaft 12 is a carrier sleeve 31, from one extremity of which extends radially an annular flange 32. Projecting from one side of the flange, that opposite the series of gears, are pairs of lugs 33, 33, these pairs being separated by 180 degrees. Fulcrumed at 34, between the lugs of each pair, are opposite connecting levers 35 extending through slots 36 in the flange 32. Each of these levers moves between a pair of abutment arms 37, 37 furnished with opposite parallel contact faces 38, 38. Against these faces the levers may bear so that the abutments take their lateral thrust. At the ends of the levers 35, adjacent the series of gears, each has an inturned angular portion 39 arranged to enter any one of a series of pairs of depressions 40 at the ends of sleeves 24, 25, 26 and 27. At the sides of these depressions are surfaces 41 contacting with the portions 39 of the levers to communicate their revolution to the particular gear with the recesses 40 of which the levers are engaged. Fixed to the shaft 12, within the levers and between the carrier 31 and sleeve 24, is a cam or controlling sleeve 42 having a series of cylindrical faces 43, 44 and 45, which, with the surface of the shaft 12 at the right of the sleeve 42, as viewed in Figs. 1 and 2 of the drawings, furnish gradually increasing steps, differing in diameter as do the sleeves 24, 25, 26 and 27. Between the surface of the shaft 12 and the cam surfaces 43, 44 and 45 are tapering surfaces 46 connecting each cylindrical surface with that next in order of greater diameter. With these surfaces of the shaft and cam contact the ends of projections 47 near the centers of the levers 35, springs 48 fixed to the periphery of the flange 32 serving to force the projections toward the cam. The length of the projections 47 and 39 is such that, when the former are resting upon a particular cylindrical surface of the shaft or cam, the latter are horizontally alined with the recesses 40 of the corresponding gear sleeves. Inclined surfaces 47′ upon the inner sides of the projections 47 facilitate their movement over the surfaces 46.

Near one extremity of the carrier sleeve 31 is a circumferential groove 49 to receive the forked end of a bar 50. To this bar is connected a shifting rod 51 having a bearing at 52 in the frame and joined by a link 53 to an actuating lever 54. The lever is fulcrumed upon a bracket 55 secured to the frame, which bracket has a front wall 56 along which the lever moves, and opposite end walls 57, 57. Journaled in the walls 57 is a horizontal shaft 58, from which project four controlling arms 59, spaced from one another along their shaft by distances equal to those between the pairs of depressions 40, and being in the present instance 90 degrees apart about the shaft. In the plane of each of the arms 59 is a vertical slot 60 through the plate 56, said slot permitting the corresponding arm to project beyond the front face of the plate into the path of the lever 54. For the purpose of rotating the shaft 58, it bears upon its outer end a crank or actuating member 61. Fast upon the shaft adjacent to the crank is an index disk 62, in the periphery of which are notches 63 spaced by angles equal to those between the arms 59, or 90 degrees. Contacting with the periphery of the disk, to enter any one of the notches as they revolve beneath it, is a spring-pressed pawl 64 pivoted upon an upward extension from the bracket 55. The disk adjacent to the notches may bear index numerals, as "1," "2," "3" and "4," the numeral associated with the notch engaged by the pawl showing the particular arm 59 which is projected through the plate 56 into the path of the lever 54 and consequently the gear of the series 20, 21, 22 and 23 selected, and the recesses 40 of which are engaged by the portions 39 of the connecting levers.

With the operating lever 54 at its extreme outer position, as seen in Fig. 1 of the drawings, its movement in this direction being limited by a stop-collar 65 fixed to the shaft 12 and with which the sleeve 31 contacts, the connecting lever projections 47 will rest upon the periphery of the shaft 12, and the projections 39 of the levers will be out of engagement with all of the sleeve recesses 40. Consequently at this time the sleeves will all be free to turn upon the shaft 12 and will not transmit the rotation of the driving shaft 10. If the operator desires to impart rotation to the gear 20, he will turn the crank 61 until the notch marked "1" is engaged by the pawl 64, and will then thrust the lever 54 to the left (Figs. 1 and 7) until it comes in contact with the first of the projections 59, which for this setting projects through its slot 60. This causes the connecting lever portions 39 to enter the notches 40 of the inner sleeve 24 and compel the rotation of the shaft under the influence of the driving gear 19. Power is then transmitted through gearing 66 to the driving shaft 11. If thereafter it is desired to increase the speed of rotation of the shaft 11, a rotation of the crank to the appropriate disk notch will project the corresponding arm 59 into the path of the operating lever. Thereupon, movement of the lever until it is stopped by the set arm will cause the lever projections 47 to ride successively up the inclines 46 and across the cylindrical faces 45 until the position determined by the said arm is reached. As the projections move over the first incline, the engaging extremities 39 of the levers are carried clear of the slots with which they have been in engagement, over the adjacent edge of the sleeve in which these slots are formed, bringing them into proper alinement to enter the slots of the next sleeve. Through these they travel as the projections 47 pass over the faces 45, and so on until the selected position is reached. A reverse movement of the operating lever to its initial position will disconnect the gearing and stop the drive.

I claim:

1. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion, a connecting member mounted to rotate with the shaft of said last-mentioned series and being longitudinally movable thereon to permit contact with any of the engaging portions, and means fixed against movement upon said shaft and over which the connecting member moves to determine its contact with a particular engaging portion.

2. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion situated at different distances from the axis of the shaft, a connecting member mounted to rotate with the shaft of said last-mentioned series and being longitudinally movable thereon to permit contact with any of the engaging portions, and means carried by said shaft and over which the connecting member moves to determine its distance from the axis of the shaft and its consequent contact with a particular engaging portion.

3. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion, a connecting member mounted to rotate with the shaft of said last-mentioned series and being longitudinally movable thereon to permit contact with any of the engaging portions, and a cam member fixed against movement upon said shaft and controlling the contact of the connecting member with a particular engaging portion.

4. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion, a connecting member mounted to rotate with the shaft of said last-mentioned series and being longitudinally movable thereon to permit contact with any of the engaging portions, and a cam-sleeve secured to said shaft and having surfaces corresponding to the engaging portions and arranged for contact with the connecting member.

5. In a change-speed mechanism, a driving shaft, a driven shaft, a series of gears fixed to the driving shaft, a series of concentric sleeves surrounding the driven shaft and respectively having fast upon them a series of gears meshing with the series on the driving shaft, each sleeve being provided with a recess, a carrier splined upon the driving shaft, an arm pivoted upon the carrier and having a portion for engagement with the recesses, a cam secured to the driving shaft and having surfaces corresponding in diameter to the sleeves, with which surfaces a portion of the arm contacts, and means arranged to move the carrier to shift the arm into contact with any one of the cam surfaces.

6. In a change-speed mechanism, a driving shaft, a driven shaft, a series of gears fixed to the driving shaft, a series of concentric sleeves surrounding the driven shaft and respectively having fast upon them a series of gears meshing with the series on the driving shaft, each sleeve being provided with a recess, a carrier splined upon the driving shaft, an arm pivoted upon the carrier and having a portion for engagement with the recesses, a cam secured to the driving shaft and having surfaces corresponding in diameter to the sleeves and intermediate inclined surfaces, and means arranged to move the carrier to shift the arm into contact with any one of the cam-surfaces.

7. The combination with change-speed mechanism having pairs of gears any one of which may be brought into driving relation, each pair having an engaging portion, of a connecting member arranged to move into coöperation with any one of the engaging portions to render the corresponding pair of gears effective, and means including a contact member movable independently of the connecting member and arranged to successively aline said connecting member with the engaging portions.

8. The combination with change-speed mechanism having pairs of gears any one of which may be brought into driving relation, each pair having an engaging portion, of a connecting member arranged to move into coöperation with any one of the engaging portions to render the corresponding pair of gears effective, means arranged to successively aline the connecting member with the engaging portions, and means arranged to be set to control the movement of the connecting member to a particular engaging portion.

9. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion, a connecting member mounted to rotate with the shaft of said last-mentioned series and being longitudinally movable thereon to permit contact with any of the engaging portions, means carried by said shaft and over which the connecting member moves to determine its contact with a particular engaging portion, and means arranged to be set to selectively control the movement of the connecting member over the contact-determining means.

10. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion, a connecting member mounted to rotate with the shaft of said last-mentioned series and being longitudinally movable thereon to permit contact with any of the engaging portions, means carried by said shaft and over which the connecting member moves to determine its contact with a particular engaging portion, means arranged to be set to selectively control the movement of the connecting member over the contact-determining means, and means arranged to effect the movement of the connecting member to the position thus selected.

11. In a change-speed mechanism, a driving shaft, a driven shaft, series of intermeshing gears carried by the shafts, one of said series of gears being fixed to its shaft while the other series is normally rotatable upon its shaft, each gear of the last-named series being provided with an engaging portion, a connecting member mounted to rotate upon the shaft of said last-mentioned series and being longitudinally movable thereon to permit contact with any of the engaging portions, a cam-sleeve secured to said shaft and having surfaces corresponding to the engaging portions and arranged for contact with the connecting member, a controlling device having a stop portion corresponding to each of said surfaces, and an actuating member joined to the connecting member and movable into contact with the stop portion.

12. The combination with change-speed mechanism having pairs of gears any one of which may be brought into driving relation, of a connecting member arranged to render effective the desired pair, an actuating lever for the connecting member, a shaft having a plurality of projections revoluble into the path of the lever to control the connecting member, and means arranged to rotate and fix the position of the shaft.

13. The combination with change-speed mechanism having pairs of gears any one of which may be brought into driving relation, of a connecting member arranged to render effective the desired pair, an actuating lever for the connecting member, a shaft having a plurality of projections revoluble into the path of the lever to control the connecting member, a disk fixed to the shaft and having depressions corresponding to the projections, and a latch engaging the depressions.

Signed at Boston, in the county of Suffolk and State of Massachusetts, this tenth day of April, 1919.

HARMON E. LINDBLADH.

Witnesses:
W. F. PICKETT,
SYLVANUS H. COBB.